United States Patent [19]

Heytmeijer

[11] 4,307,065

[45] Dec. 22, 1981

[54] RAPID AND EFFICIENT RECOVERY OF MOLYBDENUM FROM SPENT MANDREL DISSOLVING ACID SOLUTION

[75] Inventor: Herman R. Heytmeijer, Hanover Township, Morris County, N.J.

[73] Assignee: Westinghouse Electric Corp., Pittsburgh, Pa.

[21] Appl. No.: 223,666

[22] Filed: Jan. 9, 1981

[51] Int. Cl.$^3$ ............................................ C01G 39/00
[52] U.S. Cl. ........................................ 423/56; 423/58; 423/593; 23/301
[58] Field of Search ...................... 423/56, 55, 58, 61, 423/593; 23/301

[56] References Cited

U.S. PATENT DOCUMENTS

| | | | |
|---|---|---|---|
| 1,250,063 | 12/1917 | Westling et al. | 423/56 |
| 1,948,407 | 2/1934 | Watts | 423/55 |
| 3,393,971 | 7/1968 | Vanderpool et al. | 423/55 |
| 3,963,823 | 6/1976 | Kulkami | 423/56 |

Primary Examiner—Herbert T. Carter
Attorney, Agent, or Firm—W. D. Palmer

[57] ABSTRACT

For rapid and efficient recovery of dissolved molybdenum from spent acid, the spent acid solution is first diluted to a predetermined acid-water volume ratio and anhydrous ammonia added thereto to raise the solution temperature to at least about 90° C. The solution temperature is maintained at less than boiling and the ammonia addition continued until the solution pH is from about 1.5 to about 3.5. The partially neutralized solution is then seeded with solid ammonium molybdate particles in order to hasten the onset of nucleation. The seeded solution is maintained at a temperature of at least about 90° C. but less than the boiling temperature for a period of from about one hour to about four hours in order to precipitate substantially all molybdenum therefrom as ammonium molybdate. Thereafter, the precipitated ammonium molybdate is separated from the residual solution.

3 Claims, 1 Drawing Figure

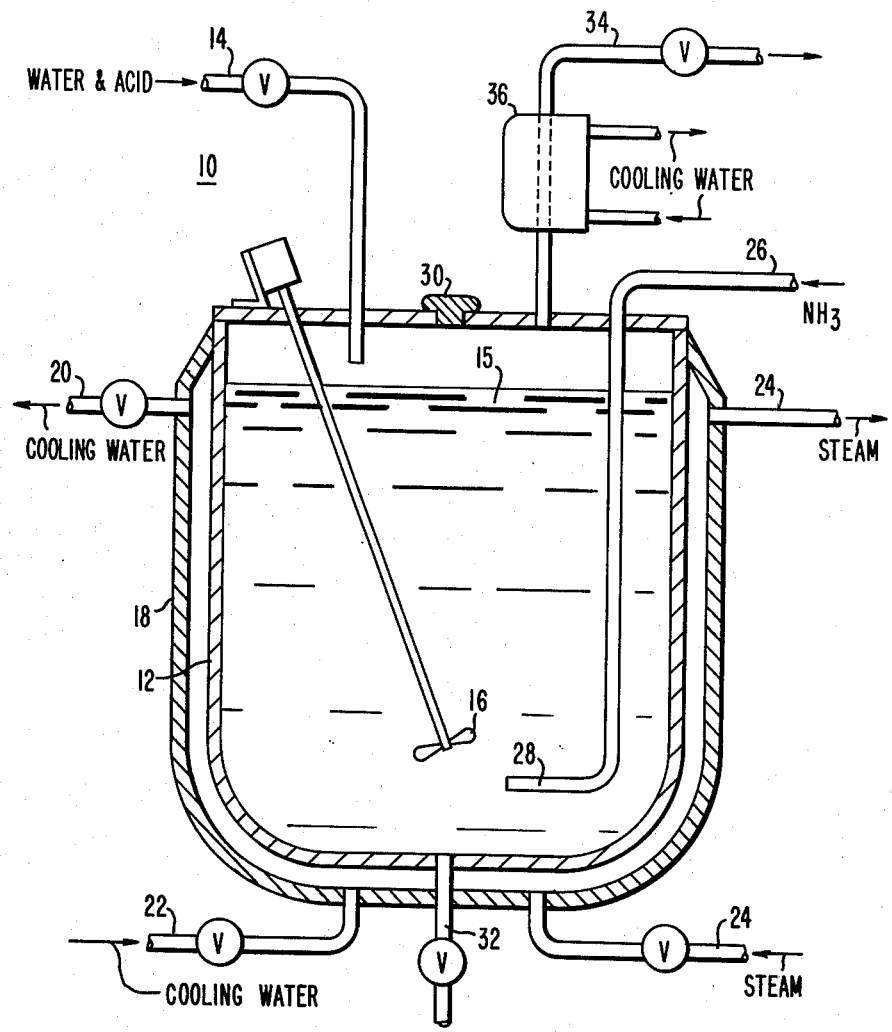

RAPID AND EFFICIENT RECOVERY OF MOLYBDENUM FROM SPENT MANDREL DISSOLVING ACID SOLUTION

BACKGROUND OF THE INVENTION

This invention relates to recovery of dissolved molybdenum from spent mandrel dissolving acid solutions and, more particularly, to the rapid and efficient recovery of dissolved molybdenum from a spent solution of mixed sulfuric acid-nitric acid.

In the processing of tungsten filament coils and especially double-coiled filaments, a very fine tungsten wire is wrapped about a small molybdenum mandrel to form a first coil. The coiled tungsten and molybdenum mandrel are then wrapped about a second mandrel so that the tungsten is in the form of a coil which in turn is formed into a coil. The formed coiled-coil is then slipped off the largest mandrel, leaving the first molybdenum mandrel in place within the turns of the smaller tungsten coil. After cutting to size, this member is immersed in a warm solution of mixed sulfuric acid and nitric acid which dissolves the retained molybdenum mandrel leaving the coiled-coil of tungsten intact. The resulting coiled-coil of tungsten is then in a form suitable for use, such as a filament for an electric lamp.

The relative concentrations of the mixed sulfuric acid and nitric acid are subject to some variation and a mixed acid solution of sulfuric acid (normality of thirteen) and nitric acid (normality of seven) has been found to be very suitable. When this acid solution has sufficient molybdenum dissolved therein so that the molybdenum is present in an amount of from about 40 grams to about 75 grams per liter of acid solution, the rate of molybdenum dissolution becomes sufficiently slow that the acid is regarded as "spent".

In U.S. Pat. No. 3,963,823, dated June 15, 1976 is disclosed a method for recovering the molybdenum from the spent acid. In accordance with the teachings of this patent, ammonium hydroxide is added to a diluted spent acid solution to partially neutralize same and raise the pH thereof to a value of from about 1.5 to about 3. The solution is then maintained in a heated condition for a pedetermined time sufficient to precipitate therefrom substantially all of the dissolved molybdenum as ammonium molybdate complex. This precipitated ammonium molybdate is then recovered for further use. More specifically, after initial partial neutralization, the solution temperature preferably is maintained at from 70° C. to 80° C. with constant solution agitation for a period of at least about ten hours and preferably from ten hours to twenty hours in order to precipitate the dissolved molybdenum as ammonium molybdate complex.

In the initial practice of the method as set forth in U.S. Pat. No. 3,963,823, the spent acid was first diluted to an acid/water volume ratio of about 1:1, in order to ensure that solution boiling did not occur during the neutralization step. Ammonium hydroxide was then added to the diluted solution to achieve the desired pH, which typically was about 2.5. As the ammonium hydroxide was added, the degree of dilution of the solution increased accordingly. After the solution was partially neutralized, it was stirred for about twelve hours to complete the precipitation. In later commercial refinements of this process, the ammonium hydroxide was replaced with anhydrous ammonia and the spent acid was initially diluted to an acid-water volume ratio of 1:3. After the solution was partially neutralized to achieve a pH of about 2.9, it was stirred for an additional twelve hours to complete the precipitation.

SUMMARY OF THE INVENTION

There is provided an improved method for quickly and efficiently recovering molybdenum in a form substantially free from other metals from a mixed sulfuric acid-nitric acid aqueous solution which has substantial quantities of molybdenum dissolved therein and which has been used to dissolve molybdenum mandrels from coiled tungsten filaments. In accordance with this improved method, the so-called "spent" mixed acid solution is diluted with water to a predetermined acid-water volume ratio. There is then added to the dilute solution anhydrous ammonia at a predetermined rate with the acid-water ratio and the rate of addition of anhydrous ammonia causing the solution temperature to rise to at least about 90° C. The solution is maintained at less than its boiling temperature and the anhydrous ammonia addition thereto is continued until the pH is from 1.5 to about 3.5. The partially neutralized solution is then seeded with a predetermined amount of ammonium molybdate solid particles and the seeded and heated solution is then maintained at a temperature of at least about 90° C. but less than the solution boiling temperature for a period of from about one hour to about four hours. This shortened time is sufficient to precipitate substantially all molybdenum therefrom an ammonium molybdate. Thereafter, the resulting precipitated ammonium molybdate is separated from the residual solution.

BRIEF DESCRIPTION OF THE DRAWING

For a better understanding of the invention, reference may be had to a preferred apparatus for practicing the present method shown in the accompanying drawing in which the sole FIGURE is a specially designed precipitating tank adapted to have anhydrous ammonia introduced therein and adapted for external heating and cooling which is required.

DESCRIPTION OF THE PREFERRED EMBODIMENT

It has been determined that the rate at which ammonium molybdate crystallizes from a partially neutralized spent acid solution is dependent on the temperature of the solution and the higher the temperature, the more rapid the molybdate crystallizes out of solution. For example, in a typical test the residual dissolved molybdenum content of the partially neutralized solution dropped to 0.15 gram/l after 2.5 hours of stirring with the solution temperature maintained at 92° C. On a test conducted with the same solution, the solution temperature was allowed to fall from the partial neutralization temperature of 94° C. to 75° C., and after 4.5 hours of stirring during precipitation, the residual molybdenum content was measured at 0.36 gram/l.

The higher temperatures also result in an earlier onset of nucleation. In a typical test, the solution temperature was maintained at 92° C. after the partial neutralization and a noticeable haze in the solution developed in about 20 minutes. In an otherwise similar test, the solution was permitted to cool to 75° C. after neutralization and a similar haze did not appear until after one hour. The foregoing effects of temperature are not due to evaporation of water since this was prevented in the foregoing tests by ensuring that water from the precipitating containers was not evaporated. The higher temperature precipitation also produced a highly crystalline material which settled very rapidly.

As indicated herebefore, in the refined commercial practice of U.S. Pat. No. 3,963,823 the "spent" acid was first diluted with water in the amount of three volumes of water per one volume of spent acid. In a second series of controlled tests, the acid/water dilution ratio was varied from 80/350 to 80/120 and the results are set forth in the following Table I, wherein the time required for first nucleation was noted along with the dissolved molybdenum content in the mother liquor after varying times.

TABLE I

Ammonium Molybdate Precipitation (Crystallization)
From Spent Mandrel Dissolving Acid - All
Temperatures Maintained at 91° C.

| Acid/Water Ratio | First Nucleation after (Min.) | Dissolved Mo Content in Mother Liquor, gms Mo/l, after: | | |
|---|---|---|---|---|
| | | 2½ hrs | 3½ hrs | 4½ hrs |
| 80/350 | 42 | 0.30 | 0.29 | 0.29 |
| 80/270 | 32 | 0.20 | 0.15 | 0.15 |
| 80/230 | 23 | 0.15 | 0.13 | 0.13 |
| 80/160 | 19 | 0.12 | 0.10 | 0.10 |
| 80/120 | 13 | 0.09 | 0.08 | 0.08 |

In order to speed up still further the precipitation of ammonium molybdate from the partially neutralized acid solution, solid ammonium molybdate particles having an average side of about 10 to 30 microns were added to the partially neutralized solution and the dissolved molybdenum content in the mother liquor was measured after varying times. The results of this test are set forth in the following Table II.

TABLE II

Effect of "Seeding" on Ammonium Molybdate
Crystallization from Neutralized (pH 2.9)
Spent Mandrel Dissolving Acid @ 95° C.

| Acid/Water Ratio | Final Neutralization Temp., °C. | Seeding 1 gm/l | Dissolved Mo Content in Mother Liquor, gms/l, after: | |
|---|---|---|---|---|
| | | | 1 hr | 2 hrs |
| 80/230 | 98° C.* | No | — | 0.54 |
| 80/230 | 98° C.* | Yes | 0.42 | 0.23 |

*The high temperature is the result of a somewhat fast neutralization (22 min.)

In a further controlled test, the acid water ratio was varied from 80/270 to 80/160 and the particle size of the resulting precipitate was measured. In addition, the effect of molybdenum content in the spent acid on precipitated molybdate particle size was measured and the results are set forth in the following Table III. As shown therein, the higher the molybdenum content in the spent acid, the larger the particle size of the precipitated ammonium molybdate. Larger particle sizes are desirable since the precipitated product is easier to separate from the mother liquor. The larger particle sizes also are dried more readily than the smaller particle sizes.

TABLE III

Ammonium Molybdate Crystallization from "Spent"
Mandrel Dissolving Acid - @91° C.

| Acid/Water Ratio | Ammonium Molybdate Particle Size, microns |
|---|---|
| A. Spent Acid contains 60 gms Mo/l | |
| 80/270 | 9.0 |
| 80/230 | 15.4 |
| 80/160 | 27.0 |

TABLE III-continued

Ammonium Molybdate Crystallization from "Spent"
Mandrel Dissolving Acid - @91° C.

| Acid/Water Ratio | Ammonium Molybdate Particle Size, microns |
|---|---|
| B. Spent Acid contains 74 gms Mo/l | |
| 80/230 | 27.0 |

An apparatus for practicing the present process is shown in diagrammatic sectional view in the sole FIGURE. The apparatus 10 comprises a precipitating tank 12 which can be fabricated of stainless steel. In practicing the process, water is first added to the tank 12 through the valved inlet line 14 and acid is then added thereto, with the acid/water ratio in the mixed solution 15 preferably being from about 80/120 to about 80/160. A motor driven impeller 16 is then turned on for about one minute to insure homogeneous mixing of the acid and water. The tank 12 is provided with a cooling-heating jacket 18 which connects through a valved conduit 22 to a cooling water supply with the cooling water outlet being a valved conduit 20. Valved inlet and outlet conduits 24 connect to a steam heating supply.

After the water and acid are mixed, the impeller 16 is turned off, the cooling water is turned on, and anhydrous ammonia is introduced into the tank 12 through a feedline 26 which terminates in a sparger-type gas distributor 28. For a tank which holds 275 gallons (1040 liters) of diluted acid solution 15, anhydrous ammonia is introduced into the tank at a rate of about 1200 to 3700 grams per minute. The reaction is strongly exothermic and the solution temperature will rapidly rise to at least about 90° C. with the circulation of the cooling fluid through the tank jacket 18 preventing boiling. It should be noted that solution boiling during the partial neutralization step and during later precipitation is avoided for practical reasons, i.e., the resulting excessive evaporation of the water and the attendant evolution of acid fumes.

The rate of ammonia addition can be varied considerably and the faster the neutralization process, the greater the cooling required. Under the foregoing conditions, the solution pH increases to about 1.5 in a period of about 20 minutes to about 1 hour, depending upon the rate at which anhydrous ammonia is introduced. Precipitation of ammonium molybdate can be effected at a solution pH of from about 1.5 to about 3.5 with the solution temperature maintained at least about 90° C., but less than boiling. It is preferred, however, to effect precipitation at a pH of from about 2.5 to about 3, with a specific example being about 2.9. When the solution pH has risen to 1.5, the impeller 16 is turned on, in order to insure homogeneous mixing and accurate pH readings. As a specific example, the ammonia addition is continued for another 10 minutes to 30 minutes, depending upon the rate of addition, until the solution pH is 2.9.

Immediately after the partial neutralization, the solution is seeded with a small predetermined amount of ammonium molybdate solid particles in order to enhance the onset of nucleation. As a specific example, one gram per liter of solution of ammonium molybdate particles having an average size of approximately 27 microns are added to the tank 12 through access door 30 while continuing the agitation of the solution with the impeller 16. The cooling water is then shut off and drained from the jacket 18 and the temperature of the tank maintained at least about 90° C., but less than the solution boiling temperature, by heating steam which is introduced to the jacket 18 through the valved inlet and outlet lines 24. The solution agitation is continued and under these conditions, substantially all molybdenum will be precipitated from the solution in a period of from about 1 hour to about 4 hours, with the molybdate precipitate being rapid settling and having a large particle size, 27 microns being representative. As a specific example, about 2 hours is normally sufficient to precipitate all molybdate.

After precipitation and settling, the mother liquor is siphoned off and substantially all precipitate collected from the tank 12 through the outlet 32. The reclaimed ammonium molybdate can then be washed with a decantation process to remove residual ammonium sulfate/nitrate from the precipitated crystals. The resulting reclaimed ammonium molybdate has a variety of uses.

As a further refinement, the tank 12 is also provided with a valved exhaust line 34 which is provided with a water-cooled condenser 36 so that any water vapor and acid fumes evolved during the neutralization step are condensed for return to the tank 12.

While the preferred acid water ratio is from about 80/120 to about 80/160, acid solutions which are even less diluted can be used provided adequate cooling is provided during the partial neutralization.

What is claimed is:

1. The method of quickly and efficiently recovering molybdenum from a mixed sulfuric acid-nitric acid aqueous solution having substantial quantities of molybdenum dissolved therein, said mixed acid solution having been used to dissolve molybdenum mandrels from coiled tungsten filaments, which method comprises:

diluting said mixed acid solution with water to a predetermined acid-water volume ratio, adding anhydrous ammonia to said diluted solution at a predetermined rate with the predetermined acid-water ratio of said diluted solution and the predetermined rate of anhydrous ammonia addition thereto causing the solution temperature to rise to at least about 90° C., maintaining the solution temperature at less than its boiling temperature, and continuing the controlled anhydrous ammonia addition to said solution until the solution pH is from about 1.5 to about 3.5;

seeding the partially neutralized solution with a small predetermined amount of ammonium molybdate solid particles;

maintaining the seeded and heated solution at a temperature of at least about 90° C. but less than the solution boiling temperature for a period of from about one hour to about four hours to precipitate substantially all molybdenum therefrom as ammonium molybdate; and separating the resulting precipitated ammonium molybdate from the residual solution.

2. The method as specified in claim 1, wherein said mixed acid solution is diluted with about 1.5 to about twice the volume of water, external cooling is applied to said solution during anhydrous ammonia addition thereto to prevent boiling of said diluted solution, and anhydrous ammonia addition is continued until the solution pH is from about 2.5 to about 3.

3. The method as specified in claim 2, wherein said seeding is accomplished by adding to said heated solution ammonium molybdate solid particles in amount of about one gram per liter of said heated solution, and external heating is applied to the seeded solution during precipitation of said ammonium molybdate.

* * * * *